(12) United States Patent
Miyata

(10) Patent No.: US 6,393,001 B1
(45) Date of Patent: May 21, 2002

(54) SATELLITE COMMUNICATION SYSTEM, ROUTING METHOD FOR THE SYSTEM AND STORAGE DEVICE WITH PROGRAM OF THE ROUTING

(75) Inventor: Shunsuke Miyata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/081,244

(22) Filed: May 19, 1998

(30) Foreign Application Priority Data

Jun. 13, 1997 (JP) .............................................. 9-171175
Dec. 11, 1997 (JP) .............................................. 9-361671

(51) Int. Cl.⁷ ........................... H04B 7/185; H04Q 7/00
(52) U.S. Cl. ....................................... 370/316; 370/329
(58) Field of Search ................................ 370/270, 316, 370/322, 326, 329, 341, 468, 409, 392, 397, 399

(56) References Cited

U.S. PATENT DOCUMENTS 5,485,464 A     1/1996  Strodtbeck et al.
5,914,942 A  *  6/1999  Hassan et al. ............... 370/316
6,016,319 A  *  1/2000  Kshirsagar et al. ......... 370/410
6,141,333 A  * 10/2000  Chavez, Jr. .................. 370/338
6,181,695 B1 *  1/2001  Curry et al. ................. 370/356
6,201,797 B1 *  3/2001  Leuca et al. ................. 370/316
6,205,473 B1 *  3/2001  Thomasson et al. ........ 709/217
6,205,485 B1 *  3/2001  Kikinis ........................ 709/231

FOREIGN PATENT DOCUMENTS

JP           9-64937        3/1997

* cited by examiner

Primary Examiner—Wellington Chin
Assistant Examiner—Brenda Pham
(74) Attorney, Agent, or Firm—Arent Fox Kintner Plotkin & Kahn, PLLC

(57) ABSTRACT

The management computer selects one of logical channels when a client computer requests usage of logical channel, executes routing procedure to connect the selected logical channel with the client computer, and clears the routing of the logical channel from the server computer to the client computer when the client computer notifies the end of logical channel usage to the management computer.

16 Claims, 15 Drawing Sheets

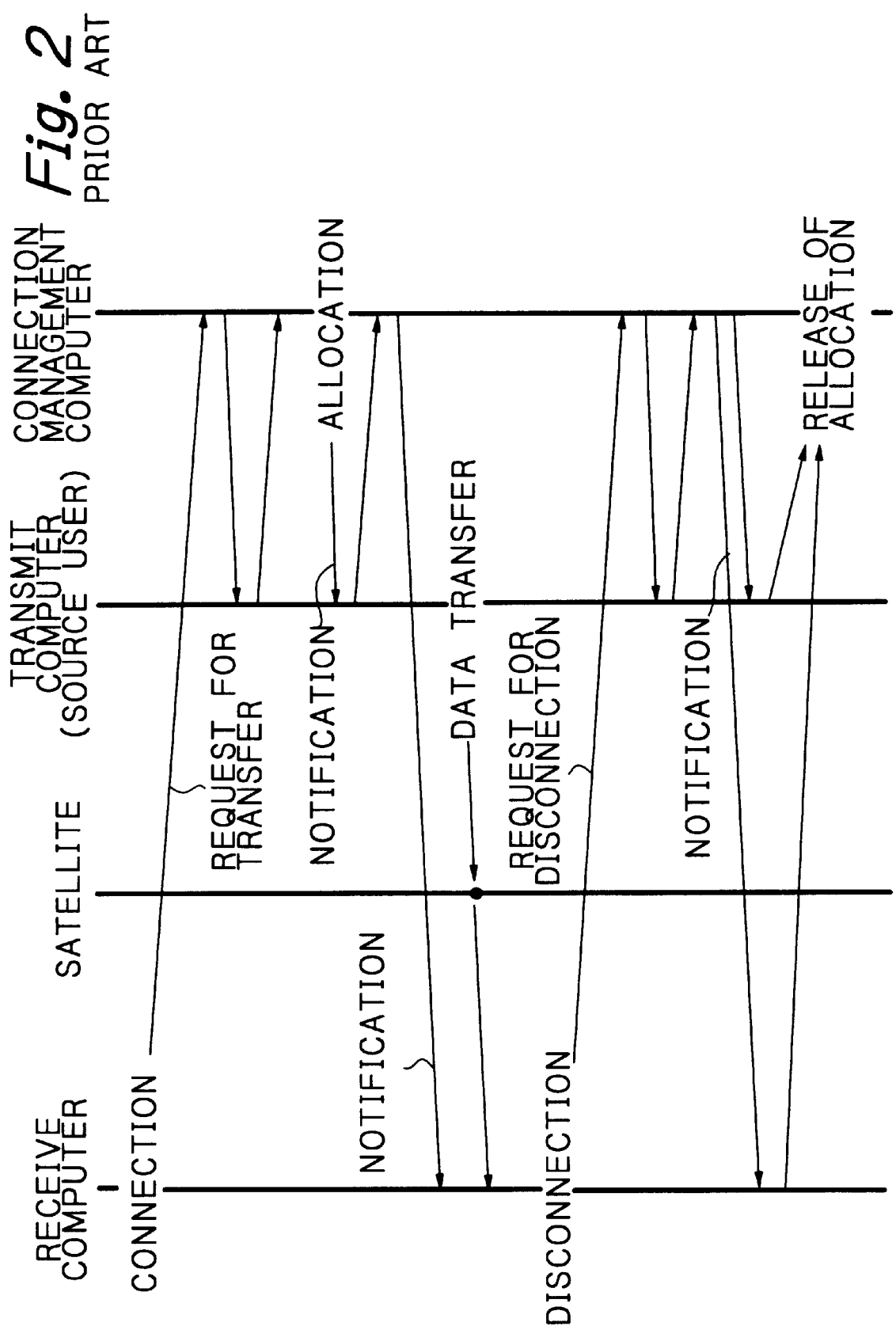

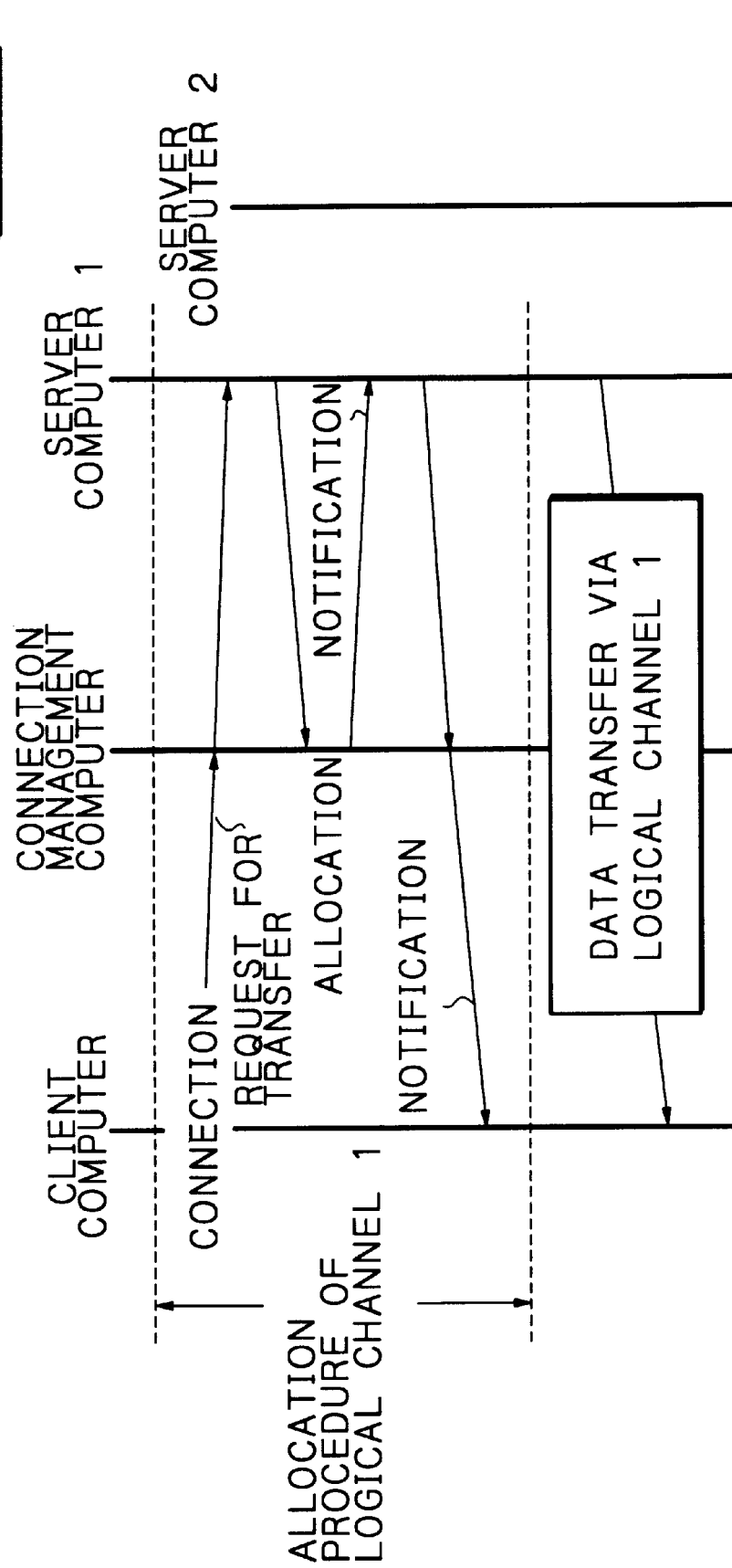

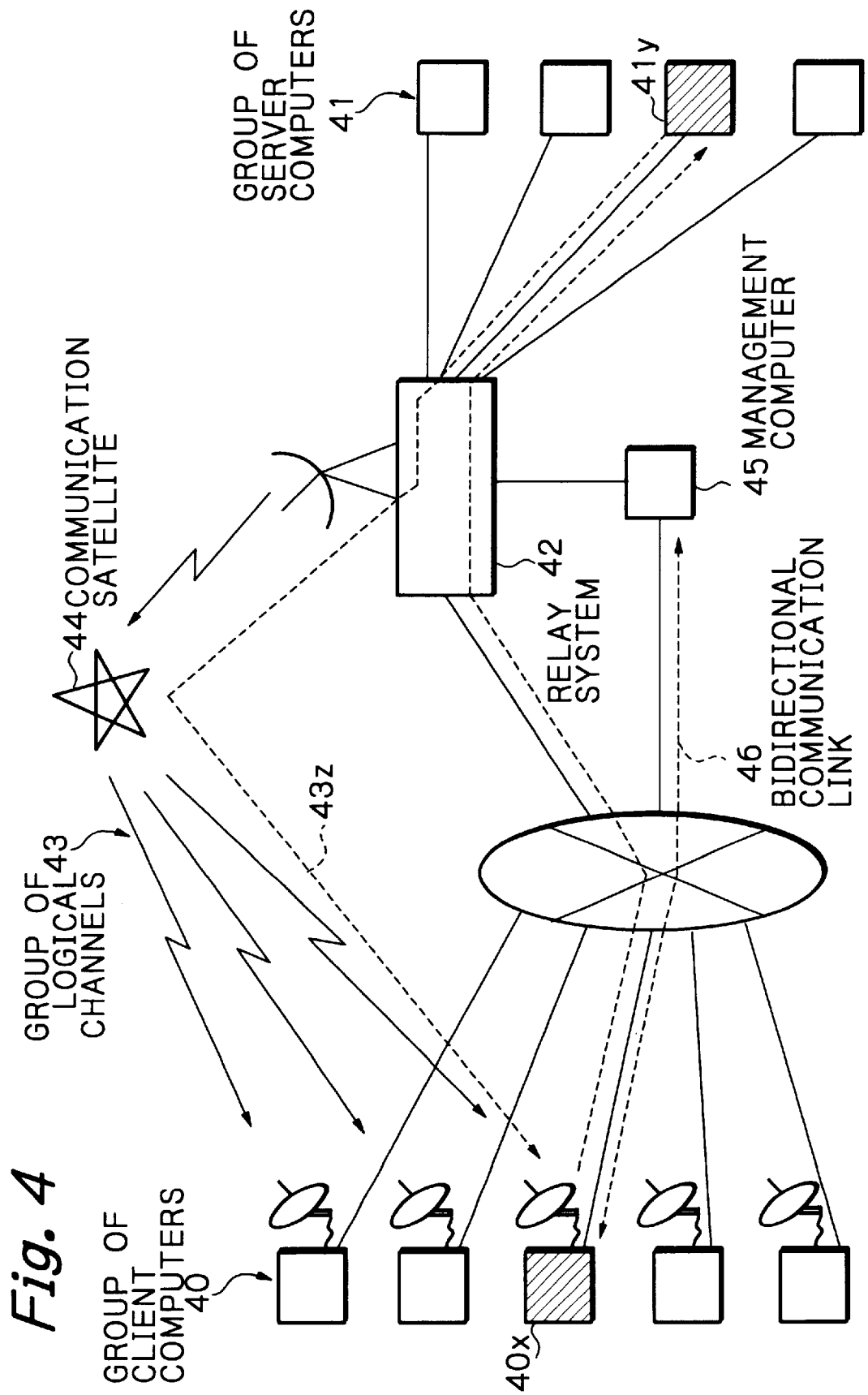

SATELLITE COMMUNICATION SYSTEM, ROUTING METHOD FOR THE SYSTEM AND STORAGE DEVICE WITH PROGRAM OF THE ROUTING

FIELD OF THE INVENTION

The present invention relates to a satellite communication system for executing routing procedure to transfer data from one computer to another computer by a relay system using a satellite or satellites. The present invention also relates to a routing method for the satellite communication system, and to a storage device, for a computer, with a program of the routing.

DESCRIPTION OF THE RELATED ART

In general, a satellite relay system simultaneously utilizes the same satellite for a plurality of relay connections through the use of multiplexing technology such as the FDMA (Frequency Division Multiple Access) method, the TDMA (Time Division Multiple Access) method (synchronous time division multiplexing method) or the cell based multiplexing (asynchronous time division multiplexing) method.

This satellite relay system will provide the similar functions as that each relay connection has an individual communication line. Since no physical communication line is in fact provided for each relay connection, this communication line is called as a logical channel or a virtual channel.

Such the satellite relay system can provide communication between any computer having functions for transmitting information via satellite and any computer having functions for receiving information via satellite. To realize the communication with respect to a connection determined by the combination of the transmit computer and the receive computer, it is necessary to use a routing method for selecting one of finite number of logical channels provided by the satellite through the use of the multiplexing technology.

As for a conventional routing method for the satellite communication, there is a "static" routing method which preliminarily allocates logical channels to the respective transmit computers or the respective receive computers in a fixed manner.

Japanese Patent unexamined publication No.9(1997)-64937 describes this "static" routing method. According to this known method, when the receive computer requests to the transmit computer to transfer data, this receive computer designates an address for a satellite communication and thus the transmit computer establishes routing via the satellite communication line defined by the designated address. In fact, this publication does not clearly teach allocation of the logical channels in the satellite communication line. However, the address for the satellite communication will be apparently used for defining this logical channel because both the transmit and receive computers can use the same logical channel depending upon the address designated by the receive computer. Furthermore, in order to prevent contention between the receive computer in question and another possible receive computers with respect to the same logical channel, it is necessary to exclusively allocate the logical channels to the respective receive computers. Therefore, the publication apparently describes the "static" routing method.

However this "static" routing method will limit the number of usable connections, namely the number of combinations of the transmit and receive computers to the finite number of the logical channels which are presented by the relay system through the use of the multiplexing technology.

Since the number of the transmit and receive computers for receiving services in the communication system will increase, it will be necessary to serially use the same logical channel for different connections. A "dynamic" routing method which allocates the logical channel dynamically at every communication is served to this end.

U.S. Pat. No. 5,485,464 describes a "dynamic" routing method. According to this known method, as shown in FIG. 1, a transmit computer (source user) requests allocation of a logical channel to a computer (network control center) in a satellite relay system, who manages the logical channels, so that the source user is routed to a receive computer (destination user) with the aid of the network control center.

International publication WO95/13681 describes another "dynamic" routing method. According to this known method, as shown in FIG. 2, a receive computer requests allocation of a logical channel to a connection management computer who manages the logical channels in a satellite relay system, then the connection management computer notifies it to a transmit computer or a service provider, and the transmit computer requests to the connection management computer so as to establish route from the service provider to the receive computer.

In a data communication system called as a client-server model, in general, a client computer (receive computer) always requests data transfer so that a server computer (transmit computer) transmits the data to the client computer. In the event that the same client computer continuously receives a plurality of data from the server computer, in a client-server model constructed to use the satellite relay system, it is desired to maintain the usage of the same logical channel without executing allocation procedure of logical channels at each transfer of data.

However, if the client-server model is constructed in accordance with the "dynamic" routing method described in U.S. Pat. No. 5,485,464, the client computer (receive computer) controls second or later transfer whereas it is the server computer (transmit computer) to control allocation of the logical channels executed in the network control center. Thus, when the server computer controls release of the allocation of the logical channel, some problems may occur. For example, in this model, if the same client computer requests next transfer of data to the server computer within a predetermined time period, the same logical channel will be kept to use, whereas if there is no request for next transfer within the time period, the allocation of the logical channel will be released. However, to realize this algorithm, it is necessary to introduce a timer mechanism. In addition, the logical channel cannot be utilized again for the predetermined time period after the client computer finishes its usage causing ineffective usage of the logical channel.

The above-mentioned problems can be solved by the "dynamic" routing method described in the international publication WO95/13681, in which allocation/release of the logical channel by the connection management computer is executed in response to requests from the client computer.

However, in the event of "Net-surfing" access in the Internet, wherein a client computer continuously receives data from a plurality of server computers, for example two server computers as shown in FIG. 3, this known routing method of WO95/13681 cannot provide that the client computer keeps the same logical channel to use. This is because since the server computer controls allocation/release of the logical channel by the connection management computer in response to the request from the client computer, if the server computer with logical channel allocation functions changes to another one, the same logical channel cannot be kept in use. Therefore, when the client computer receives data from different server computers in for example "Net-surfing" access, the routing method of WO95/13681 needs an additional procedure for switching the logical channels used causing delay in start of next transfer of data and also increase of control traffic.

SUMMARY OF THE INVENTION

It is therefore an object of the present invention to provide a satellite communication system, a routing method for the satellite communication system, and a storage device storing a program of the routing, whereby problems due to separated location of transfer control function and logical channel allocation function in different computers can be solved.

According to the present invention, a routing method wherein a receive computer or a client computer for requesting transfer of information controls routing but a transmit computer or a server computer does not concern routing procedure is provided.

More particularly, according to the present invention, a satellite communication system includes at least one client computer for requesting transfer of data, at least one server computer for transferring data in response to the request, a relay system using at least one satellite, for providing a plurality of logical channels for communication between the client computer and the server computer, and a management computer for managing the logical channels. The management computer selects one of the logical channels when the client computer requests usage of logical channel, executes routing procedure in the relay system so as to connect the selected logical channel with the client computer, and clears the routing of the logical channel from the server computer to the client computer when the client computer notifies the end of logical channel usage to the management computer.

Also, according to the present invention, a routing method for a satellite communication system which includes a relay system using at least one satellite, for providing a plurality of logical channels for communication between at least one client computer for requesting transfer of data and at least one server computer for transferring data in response to the request, and a management computer for managing the logical channels is provided. The method includes a step of requesting usage of logical channel from the client computer to the management computer before requesting data transfer, a step of selecting one of the logical channels by the management computer in response to the request for logical channel usage, a step of executing, by the management computer, routing procedure in the relay system so as to connect the selected logical channel with the client computer, a step of notifying, from the client computer, the end of logical channel usage to the management computer when the data transfer from the server computer is completed, and a step of clearing, by the management computer, the routing of the logical channel from the server computer to the client computer in response to the notification of the end of logical channel usage.

Furthermore, according to the present invention, a storage device with a program for routing in a satellite communication system which includes a relay system using at least one satellite, for providing a plurality of logical channels for communication between at least one client computer for requesting transfer of data and at least one server computer for transferring data in response to the request is provided.

The program includes a step of selecting one of the logical channels when the client computer requests usage of logical channel, a step of executing routing procedure in the relay system so as to connect the selected logical channel with the client computer, and a step of clearing the routing of the logical channel from the server computer to the client computer when the client computer notifies the end of logical channel usage.

Since the client computer, or the receive computer in the satellite relay system, leads routing for the relay system, and the server computer, or the transmit computer, does not concern the routing, no problem due to separation of transfer control functions and logical channel allocation functions occurs resulting effective serial use of the same logical channel to realize for different data transfers.

It is preferred that the system further includes a bidirectional communication link between the management computer and the client computer, and that the request for usage of logical channel from the client computer and the notification of the end of logical channel usage from the client computer are transmitted via the bidirectional communication link.

It is also preferred that, when the routing procedure is executed, the management computer notifies information necessary for using the selected logical channel, to the client computer via the bidirectional communication link.

Preferably, after the routing procedure is executed by the management computer in response to the request for usage of logical channel and before the notification of the end of logical channel usage from the client computer, data are transferred from the server computer to the client computer via the selected logical channel. Since the logical channel is assigned to the client computer, data to be transferred from the server computer to the client computer passes this selected logical channel.

It is also preferred that the relay system has a proxy server for mediating the data transfer between the client computer and the server computers so that data are transferred from the server computers to the client computer via the relay system.

Preferably, after the routing procedure is executed by the management computer in response to the request for usage of logical channel and before the notification of the end of logical channel usage from the client computer, the client computer serially receives a plurality of data from the server computers via the selected logical channel without requesting usage of logical channel again.

Further objects and advantages of the present invention will be apparent from the following description of the preferred embodiments of the invention as illustrated in the accompanying drawings.

BRIEF DESCRIPTION OF THE DRAWINGS

FIG. 2 illustrates the signal flow of another already described conventional dynamic routing method;

FIG. 3, constituted by combining FIGS. 3A, 3B and 3C, illustrates the signal flow between the client and the servers in accordance with the routing method of FIG. 2;

FIG. 4 schematically illustrates a basic concept of a satellite communication system according to the present invention;

DESCRIPTION OF THE PREFERRED EMBODIMENTS

Figure 1:
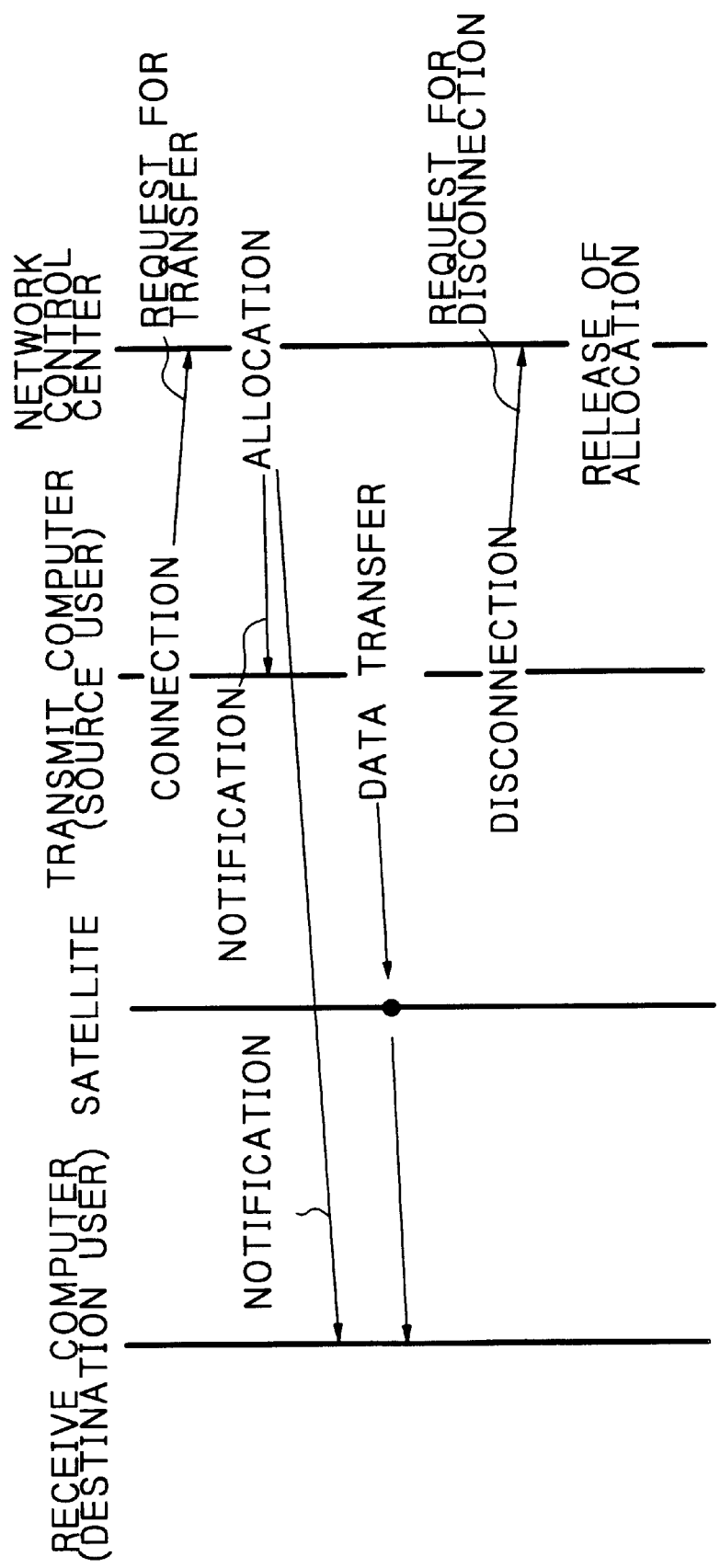
FIG. 1 illustrates the signal flow of the already described conventional dynamic routing method.

In FIG. 4 which schematically illustrates a basic concept of a satellite communication system according to the present invention, reference numeral 40 denotes a group of client computers for requesting transfers of data, 41 denotes a group of server computers for transferring data in response to the requests, and 42 denotes a relay system which can be used in communication between a server computer $41_y$ in the group 41 (the subscript y represents a specified server computer) to a client computer $40_X$ in the group 40 (the subscript x represents a specified client computer), respectively. The relay system 42 particularly provides a group of logical channels 43 through the use of multiplexing technology via a communication satellite 44 with respect to communication from the server computer $41_y$ to the client computer $40_X$. In FIG. 4, also, reference numeral 45 denotes a management computer with functions for managing the logical channel group 43 in the relay system 42, and 46 denotes a bidirectional communication link connected between the management computer 45 and the client computer group 40.

When transferring data from the client computer group 40 to the client computer $40_X$, a destination address $A_X$ will be designated. If the destination address $A_X$ is a group address, the client computer $40_X$ indicates a plurality of computers with the same group address when executing the multicasting access identified by the group address.

The communication system illustrated in FIG. 4 has the plurality of client computers and the plurality of server computers. However, according to the present invention, the communication system may have only a single client computer and a single server computer and can provide the similar operations and advantages.

Figure 5:
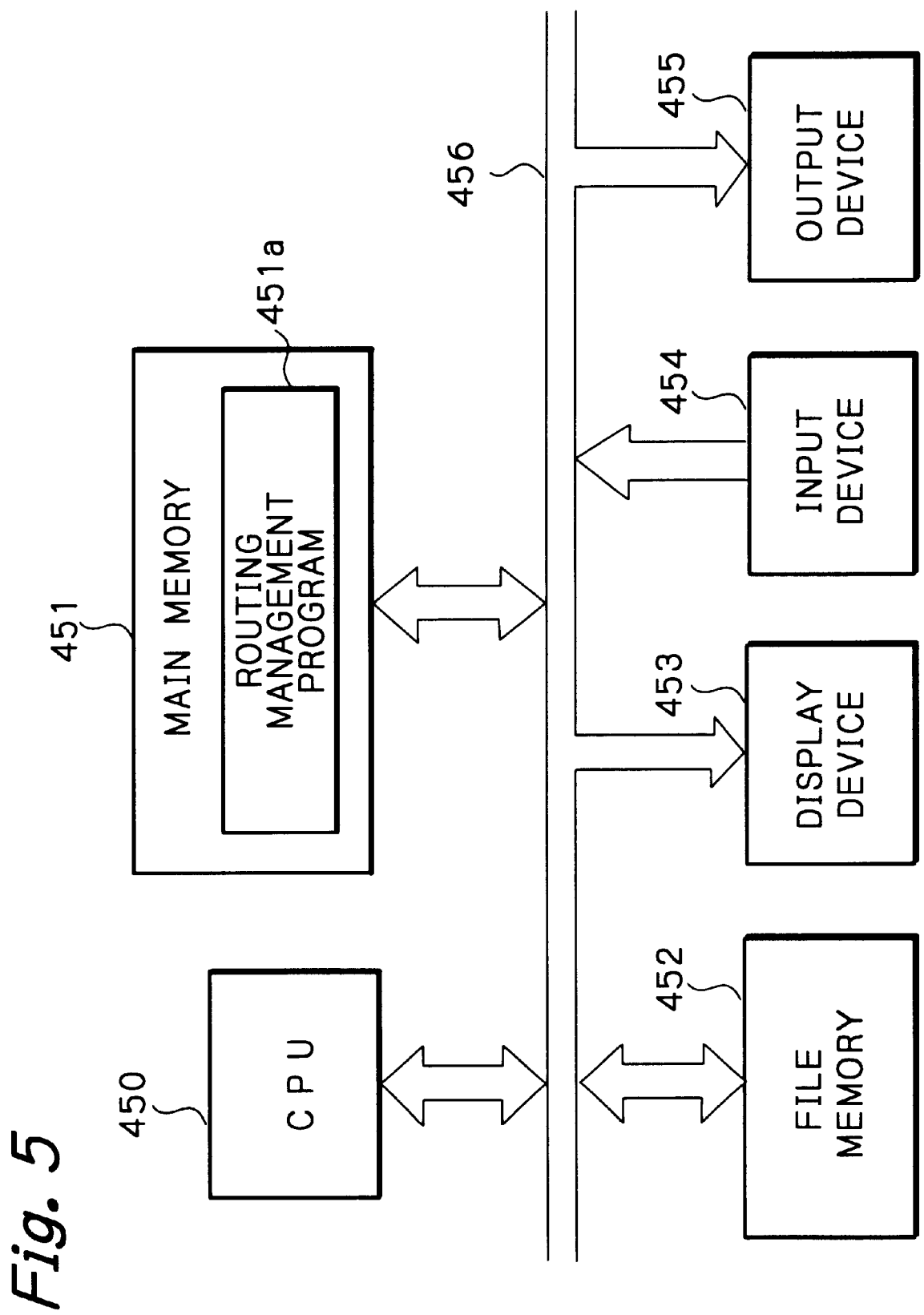
FIG. 5 shows a block diagram schematically illustrating hardware structure of a management computer shown in FIG. 4.

FIG. 5 schematically illustrates hardware structure of the management computer 45 shown in FIG. 4.

As shown in the figure, the management computer 45 has a CPU 450, a main memory 451 storing control programs such as routing management programs 451a, a file memory 452, a display device 453, an input device 454 and an output device 455, which are connected with each other by means of a bus 456. This computer 45 executes the following control operation in accordance with the routing management programs 451a.

Figure 6:
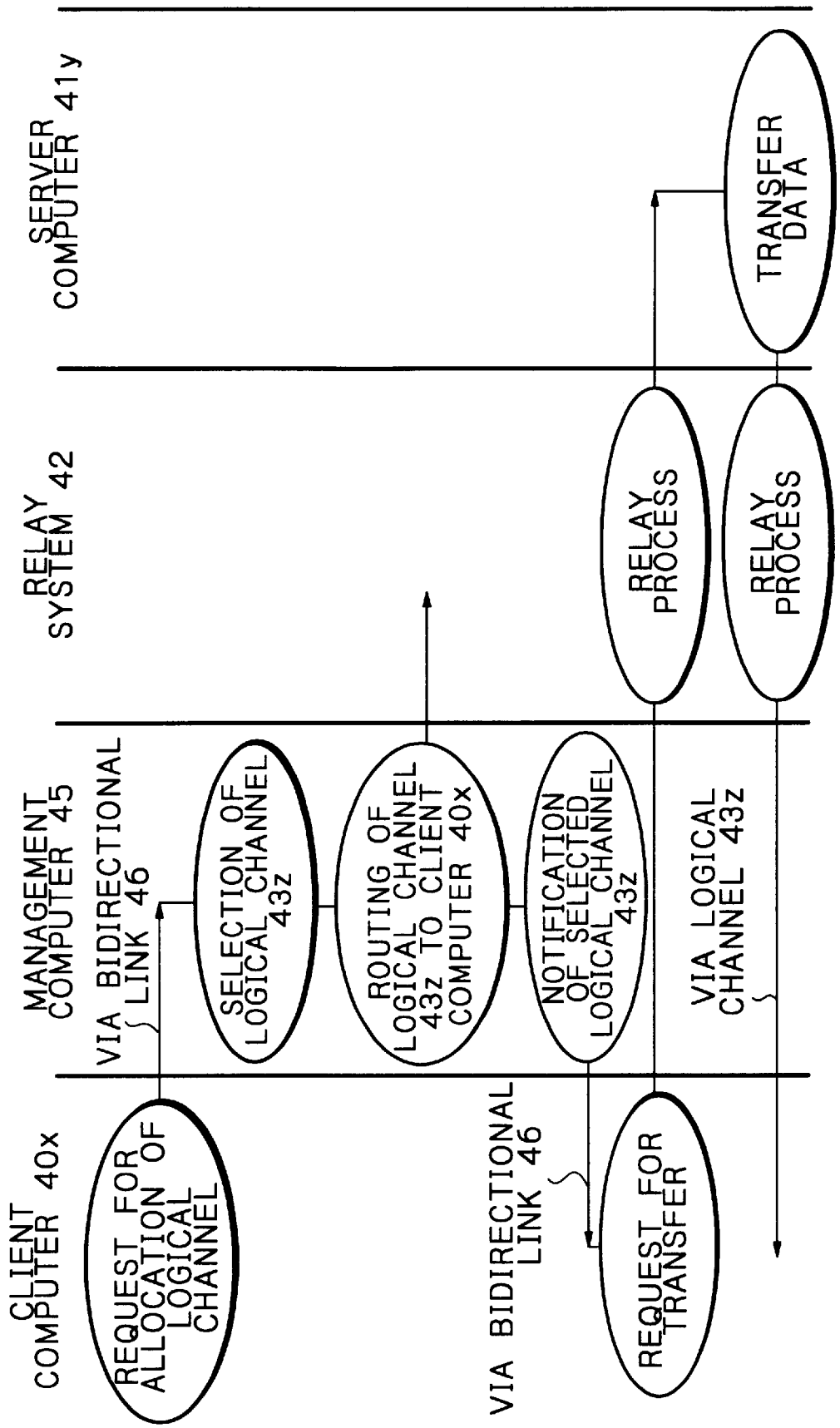
FIG. 6 illustrates a flow of communication starting procedure in the system shown in FIG. 4.

With reference to FIG. 6 which illustrates a flow of communication starting procedure in the system shown in FIG. 4, the procedure at start of the communication will be first described.

As shown in the figure, before requesting transfer of data to the server computer $41_y$, the client computer $40_X$ first requests usage (allocation) of a logical channel to the management computer 45 via the bidirectional link 46.

In response to the request, the management computer 45 selects, based upon the routing management programs 451a, a logical channel $43_Z$ (the subscript z represents a specified logical channel) used for data transfer from the server computer $41_y$ to the client computer $40_X$, and then executes the routing procedure with respect to the relay system 42 so as to connect the selected logical channel $43_Z$ with the client computer $40_X$. Then, the computer 45 notifies information which will be necessary for utilizing the selected logical channel $43_Z$ to the client computer $40_X$ via the bidirectional communication link 46. Thanks for the above-mentioned procedure, the client computer $40_X$ can receive data from any one of the server computers 41.

Thereafter, the client Computer $40_X$ requests transfer of data to the server computer 41 via the relay system 42. Then, the server computer $41_y$ transfers data to the client computer $40_X$ via the logical channel $43_Z$.

Figure 7:
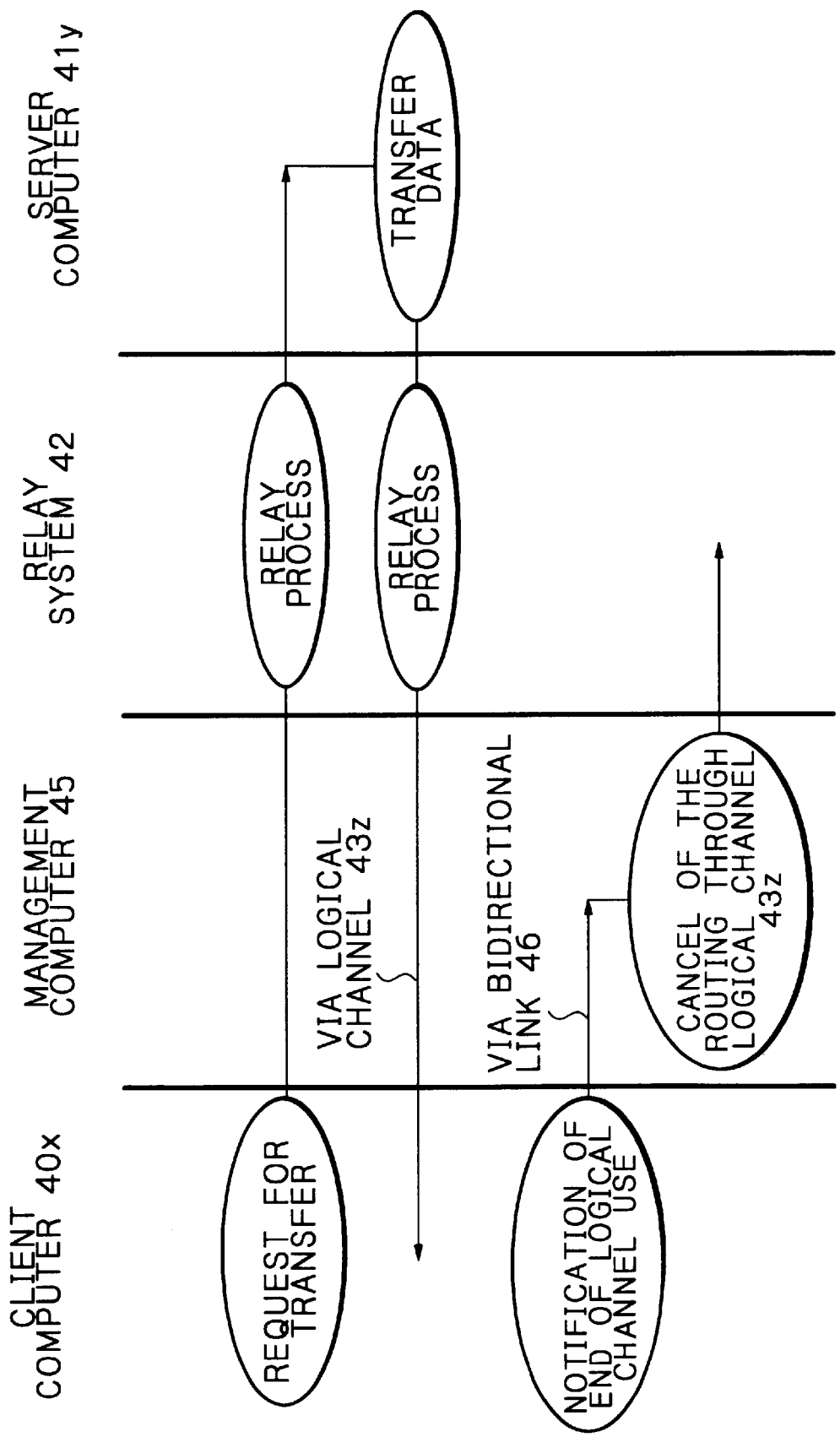
FIG. 7 illustrates a flow of communication ending procedure in the system shown in FIG. 4.

Next, with reference to FIG. 7 which illustrates a flow of communication ending procedure in the system shown in FIG. 4, the procedure at the end of the communication will be described.

As shown in the figure, when need for the logical channel $43_Z$ is eliminated due to that the data transfer from the server computer $41_y$ is ended or the client computer $40_X$ aborts the data transfer, the client computer $40_X$ notifies the end of usage of the logical channel $43_Z$ to the management computer 45 via the bidirectional link 46.

In response to the notification, the management computer 45 releases, based upon the routing management programs 451a, the allocation of the logical channel $43_Z$ which has been used for data transfer from the server computers 41 to the client computer $40_X$. Thus, the routing through the logical channel $43_Z$ is canceled so as to free this logical channel $43_Z$ for usage of another connection.

In the conventional "dynamic" routing method described in U.S. Pat. No. 5,485,464, the server computer (transmit computer) controls the routing procedure executed by the management computer with respect to the relay system. Whereas in the "dynamic" routing method according to the present invention, the client computer (receive computer) controls the routing procedure but the server computer (transmit computer) never concern to the routing procedure. In the satellite communication system using the satellite relay system, since required hardware configurations are quite different between the transmit computer and the receive computer, the roles of these computers cannot be easily changed with each other. Therefore, the feature of the present invention is never obvious from this known "dynamic" routing method.

In the other conventional "dynamic" routing method described in the international publication WO95/13681, although the receive computer requests start of the routing procedure similar to that in the method of the present invention, the transmit computer in fact controls actual routing procedure as well as the routing method of U.S. Pat. No. 5,485,464. Thus, the feature of the present invention is never obvious from the latter known "dynamic" routing method.

Figure 8:
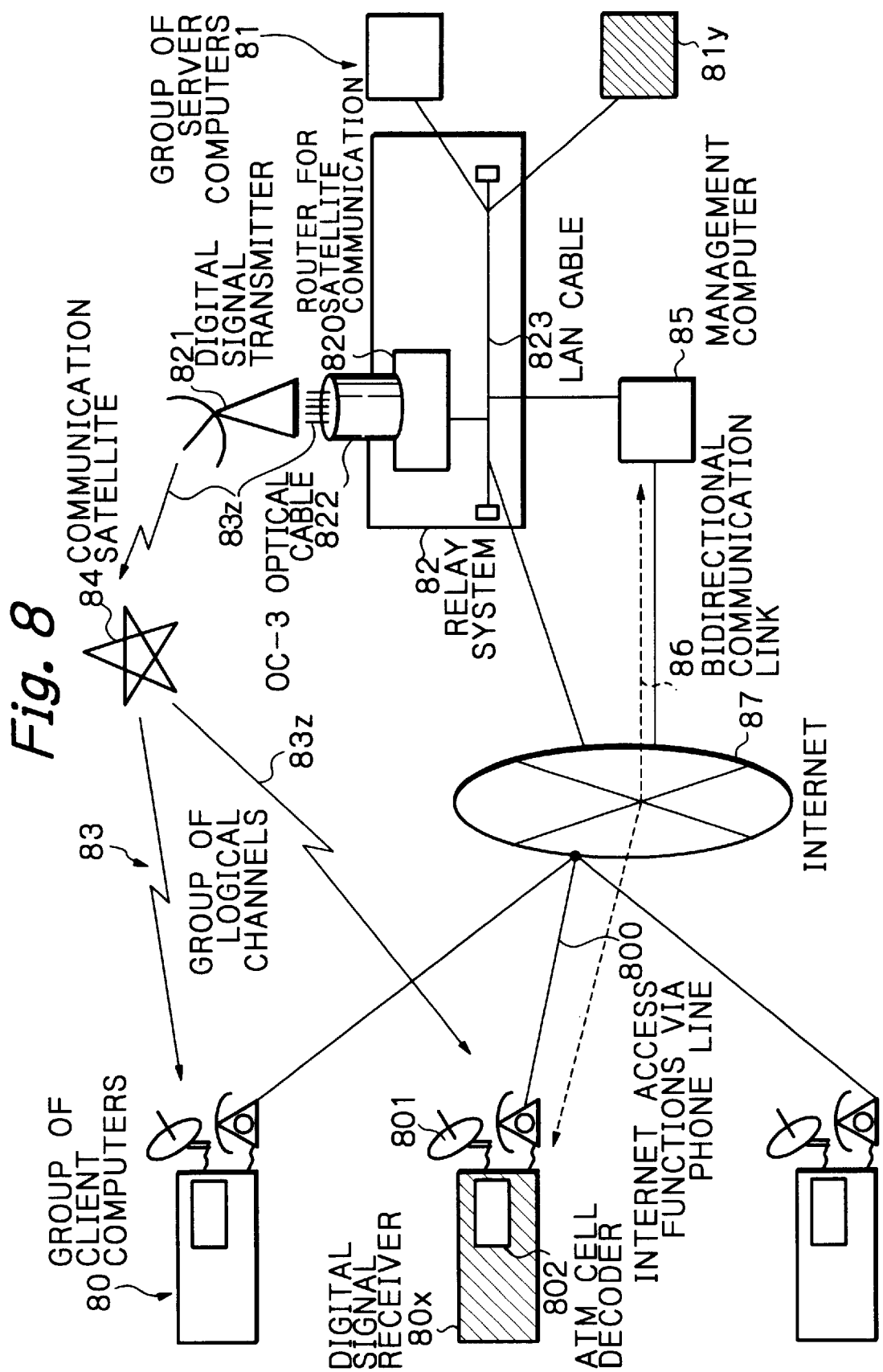
FIG. 8 shows a block diagram schematically illustrating structure of a satellite communication system of a preferred embodiment according to the present invention.

FIG. 8 schematically illustrates structure of a satellite communication system of a preferred embodiment according to the present invention.

This embodiment presents a satellite communication system for Internet access, utilizing a satellite relay system which provides a plurality of logical channels through the use of ATM (Asynchronous Transfer Mode) multiplexing on digital signals. An encapsulating process for utilizing IP protocol, used in the Internet environment, in ATM multiplexing may be realized by the known technology called as RFC1483.

In FIG. 8, reference numeral 80 denotes a group of client computers for requesting transfers of data, 81 denotes a group of server computers for transferring data in response to the requests, and 82 denotes a relay system which can be used in communication between a server computer $81_y$ in the group 81 (the subscript y represents a specified server computer) to a client computer $80_X$ in the group 80 (the subscript x represents a specified client computer), respectively. The relay system 82 particularly provides a group of logical channels 83 through the use of multiplexing technology via a communication satellite 84 with respect to communication from the server computers 81 to the client computers 80. In FIG. 8, also, reference numeral 85 denotes a management computer with functions for managing the logical channel group 83 in the relay system 82, 86 denotes a bidirectional communication link connected between the management computer 85 and the client computer group 80, and 87 denotes Internet, respectively.

Each client computer in the client computer group 80, for example the computer $80_X$, is provided with access functions 800 for accessing Internet environment via a phone line for a bidirectional communication link 86 connected with the management computer 85, and for requesting data transfer to the server computer 81. The client computer also has a digital signal receiver 801 so as to receive digital signals transmitted through the relay system 82 using the satellite 84, and an ATM cell decoder 802 for extracting ATM cells from the received digital signals. When extracting the ATM cells, data of desired communication only can be selected from the multiplexed logical channels by designating VPI/VCI (Virtual Path Identifier/Virtual Channel Identifier).

Each server computer in the server computer group 81 is connected with Internet environment via the relay system 82, and routing thereof for transferring data to the client computer group 80 is established by the satellite communication router 820 in the relay system 82.

The satellite relay system 82 is mainly constituted by the router 820 and a digital signal transmitter 821 transmitting the signals to the satellite 84. The router 820 is connected to the transmitter 821 via an OC-3 optical cable 822 to provide a plurality of logical channels by ATM cell multiplexing functions.

Figure 9:
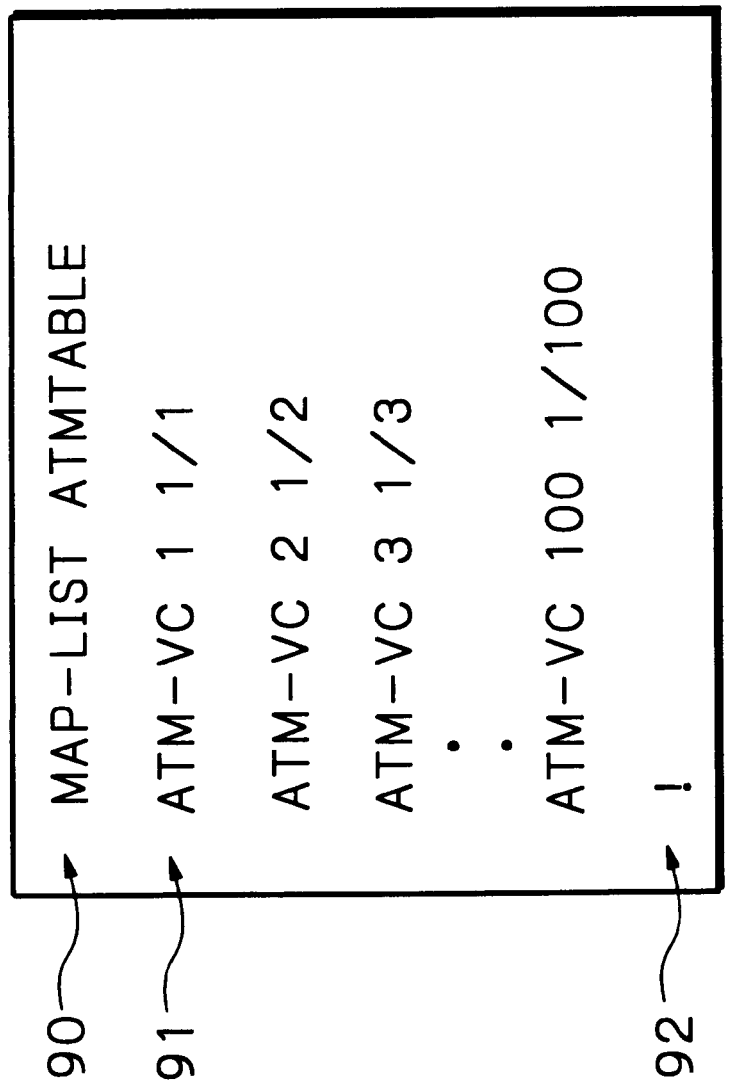
FIG. 9 illustrates an initial set procedure in a router for satellite communication in the system shown in FIG. 8.

FIG. 9 shows an example of initialization in the router 820 for providing 100 logical channels with VPI/VCI of 1/1 to 1/100. In the figure, reference numeral 90 denotes the start of record for defining the logical channels, 91 denotes existence of a logical channel with VPI/VCI=1/1 and with a name of "ATM-VC 1", and 92 denotes the end of record for defining the logical channels, respectively.

The router for satellite communication 820 connected to the management computer 85 manages routing information via a LAN (Local Area Network) cable 823. Namely, when the server computer $81_y$ transmits data to client computer $80_X$, this router 820 retrieves the routing information based upon an address of the destination client computer $80_X$ to specify the logical channel $83_Z$ used among the logical channel group 83 provided by the relay system 82. Then, the router 820 requests transfer of information to the transmitter 821 by designating the VPI/VCI of the logical channel $83_Z$.

The client computer $80_X$ can receive the digital signal of the specific communication by designating this VPI/VCI.

The management computer 85 can in bidirectional communicates with the client computer $80_X$ by means of its access functions in the Internet environment. As aforementioned, this management computer 85 is connected via the LAN cable 823 with the router 820, and thus can control the routing information in the router 820 in accordance with a certain protocol such as Telenet protocol.

Figure 10:
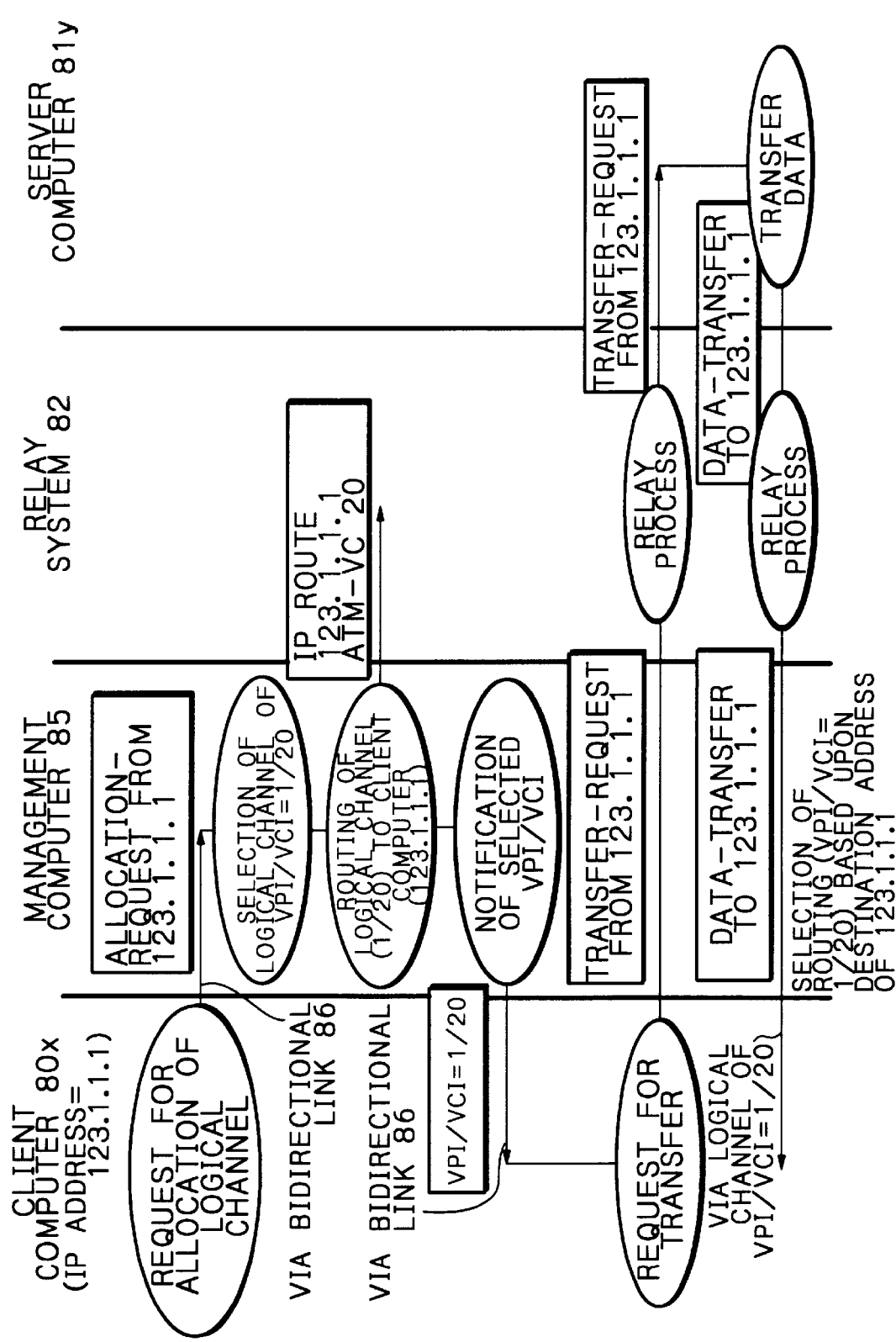
FIG. 10 illustrates a flow of communication starting procedure in the system shown in FIG. 8.

With reference to FIG. 10 which illustrates a flow of communication starting procedure in the system shown in FIG. 8, the procedure at start of the communication between the client computer $80_X$ and the server computer group 81 will be first described.

As shown in the figure, the client computer $80_X$ first requests usage (allocation) of a logical channel to the management computer 85, which manages the logical channel group 83, via the Internet environment (bidirectional link 86).

In response to the request, the management computer 85 selects, among the logical channels in the group 83 under "not used" status, a logical channel $83_Z$ used for data transfer to the client computer $80_X$, and changes the status of the selected logical channel $83_Z$ to "used" status.

Also the management computer 85 sets the routing information to the client computer $80_X$, which corresponds to the address $A_X$ of the client computer $80_X$, into the router 820. Then, the computer 85 notifies the VPI/VCI value with respect to the selected logical channel $83_Z$ to the client computer $80_X$ via the Internet 87 (bidirectional communication link 86). The client computer $80_X$ will use the VPI/VCI value notified by the management computer 85 during decoding process for extracting the ATM cells from the digital signal therein.

After that, since the router 820 is set in the each server computer $81_y$ as a routing destination toward the client computer group 80 and the logical channel $83_Z$ is set in the router 820 as the routing information, data from the server computer group 81 to the client computer $80_X$ will be transferred through this logical channel $83_Z$.

Figure 11:
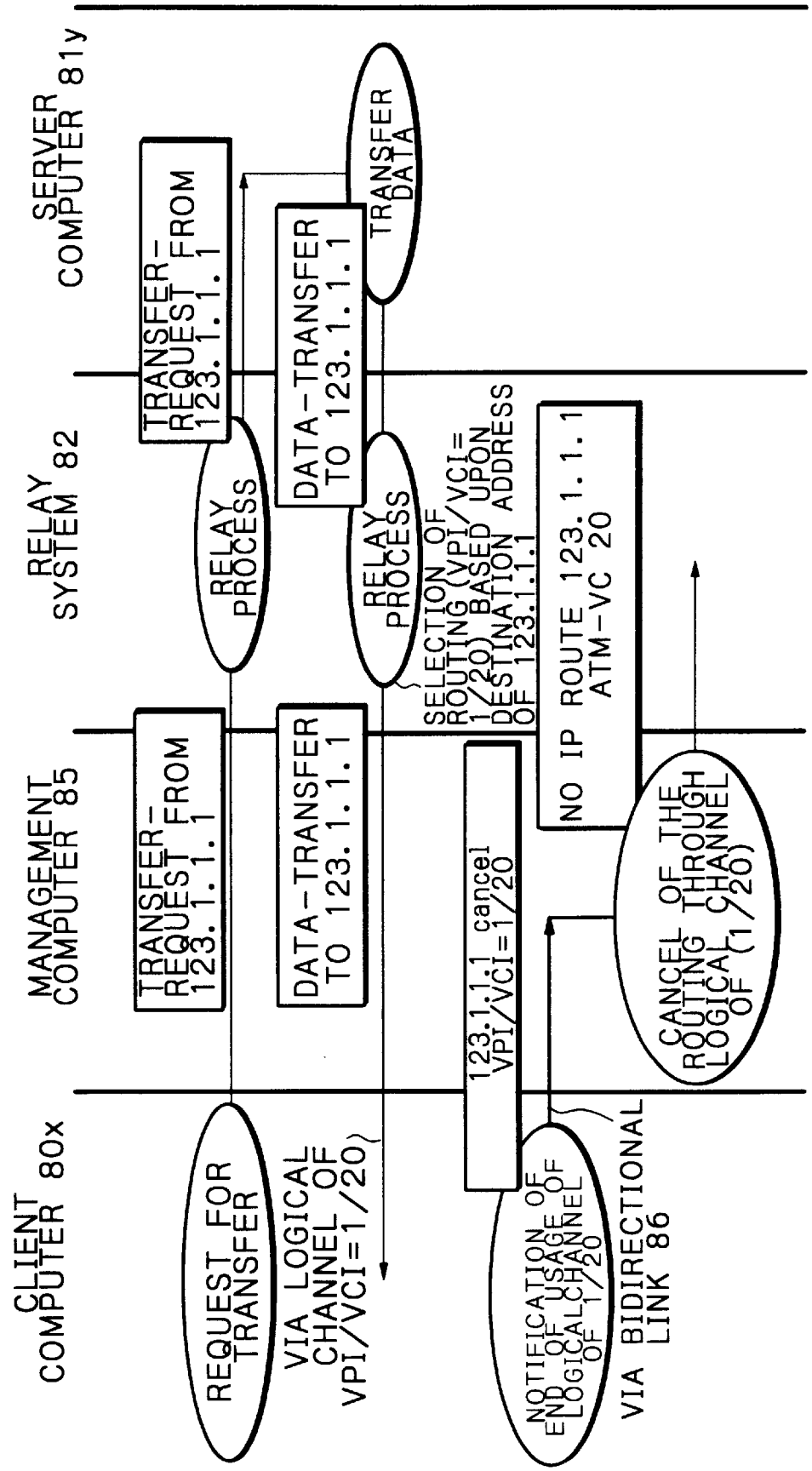
FIG. 11 illustrates a flow of communication ending procedure in the system shown in FIG. 8.

With reference to FIG. 11 which illustrates a flow of communication ending procedure in the system shown in FIG. 8, the procedure at the end of the communication between the client computer $80_X$ and the server computer group 81 will be described.

As shown in the figure, the client computer $80_X$ notifies the end of usage of the logical channel $83_Z$ to the management computer 85 via the Internet environment.

In response to the notification of the end of usage of the logical channel $83_Z$, the management computer 85 deletes, by using the LAN cable 823, the routing information with respect to the address $A_X$ of the client computer $80_X$ in the router 820. Thus, the status of the logical channel $83_Z$ changes into "not used" status so as to free this logical channel $83_Z$ for usage of connection with another client computer.

After that, although the router 820 is still set in the server computer $81_y$ as the routing destination toward the client computer group 80 but there is no routing information to the client computer $80_X$ in the router 820, no data will be transferred from the server computer group 81 to the client computer $80_X$.

Figure 12:
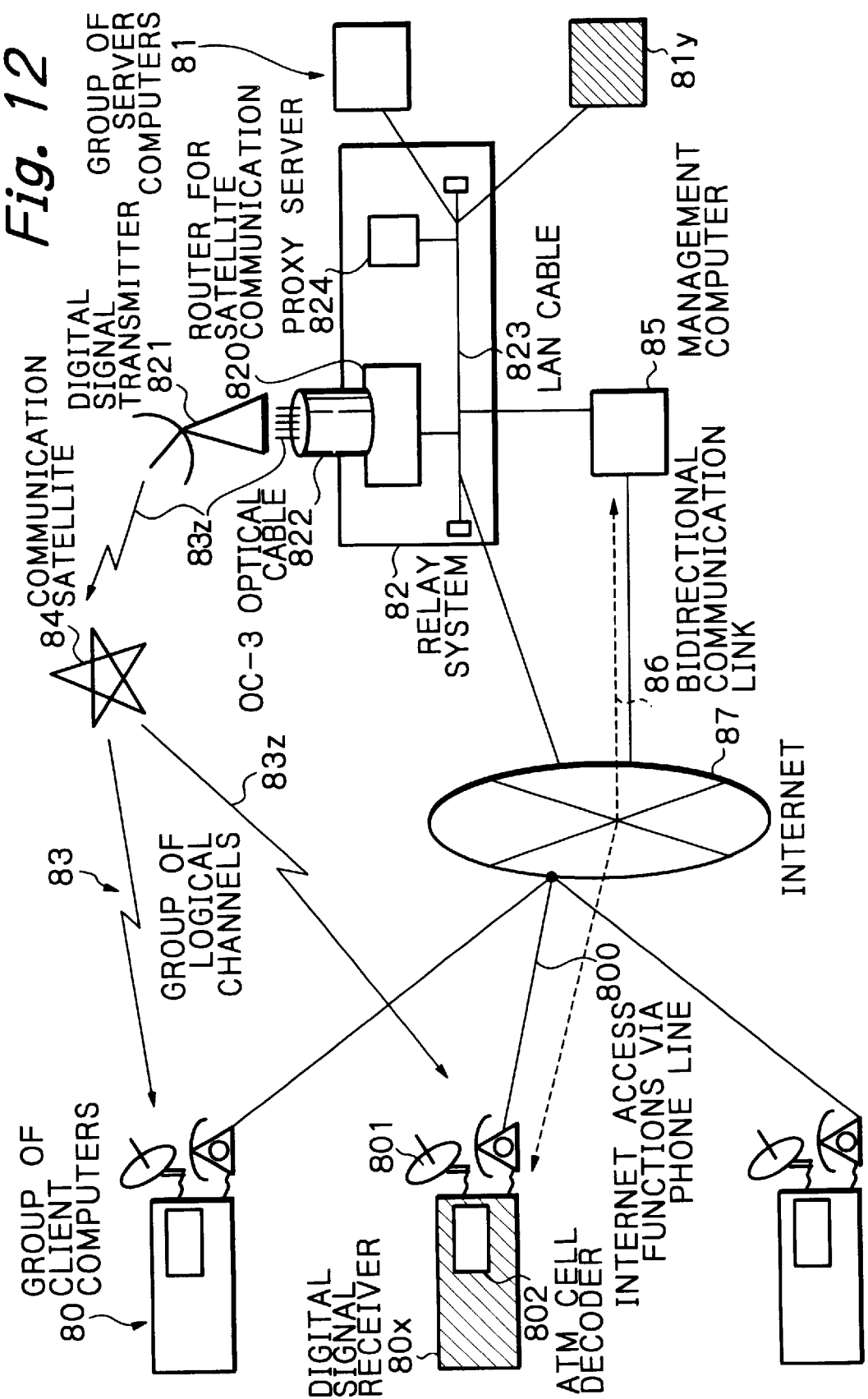
FIG. 12 shows a block diagram schematically illustrating structure of a satellite communication system of another embodiment according to the present invention.

FIG. 12 schematically illustrates structure of a satellite communication system of another embodiment according to the present invention.

Similar to the embodiment of FIG. 8, this embodiment presents a satellite communication system in which the server computer 81 does not manage the routing destination toward the client computer group 80.

In this embodiment, the relay system 82 has additionally a proxy server 824 in comparison with the structure of the embodiment shown in FIG. 8. The proxy server 824 is a computer which behaves as an agent of client computer group 80 for transferring data from the server computer group 81 to the client computer group 80. By using the proxy server 824 when the client computer $80_X$ intends to request data transfer to the server computer $81_y$, the proxy server 824 requests the data transfer to the server computer $81_y$ as if to origin the request itself and receives data from the server computer $81_y$. Then, the proxy server 824 will transmit the received data to the client computer $80_X$. According to the present invention, the router 820 is set in the proxy server 824 as a routing destination toward the client computer group 80. Thus, if the server computer group 81 transfers data to the proxy server 824, the router 820 is automatically selected as the routing destination. Therefore, it is not necessary for the server computer group 81 to manage the routing destination toward the client computer group 80. Another constitution, operations and advantages in this embodiment are the same as those in the embodiment of FIG. 8.

As aforementioned, according to the present invention, logical channels provided by the satellite relay system can be serially used for different connections between client computers and server computers.

Since allocation of the logical channels is controlled in response to data transfer request from the client computer, when the client computer serially receives data from a server computer or server computers, no routing control is necessary to do at each connection. In addition, it is possible to request from the client computer the end of routing procedure when all the data transfers are completed.

As will be apparent from the above description, according to the present invention, the management computer selects one of the logical channels when the client computer requests usage of logical channel, executes routing procedure in the relay system so as to connect the selected logical channel with the client computer and with the server computer, and clears the routing of the logical channel from the server computer to the client computer when the client computer notifies the end of logical channel usage to the management computer.

Since the client computer, or the receive computer in the satellite relay system, leads routing procedure for the relay system, and the server computer, or the transmit computer, does not concern the routing procedure, no problem due to separation of transfer control functions and logical channel allocation functions occurs resulting effective serial use of the same logical channel to realize for different data transfers.

Figure 3B:
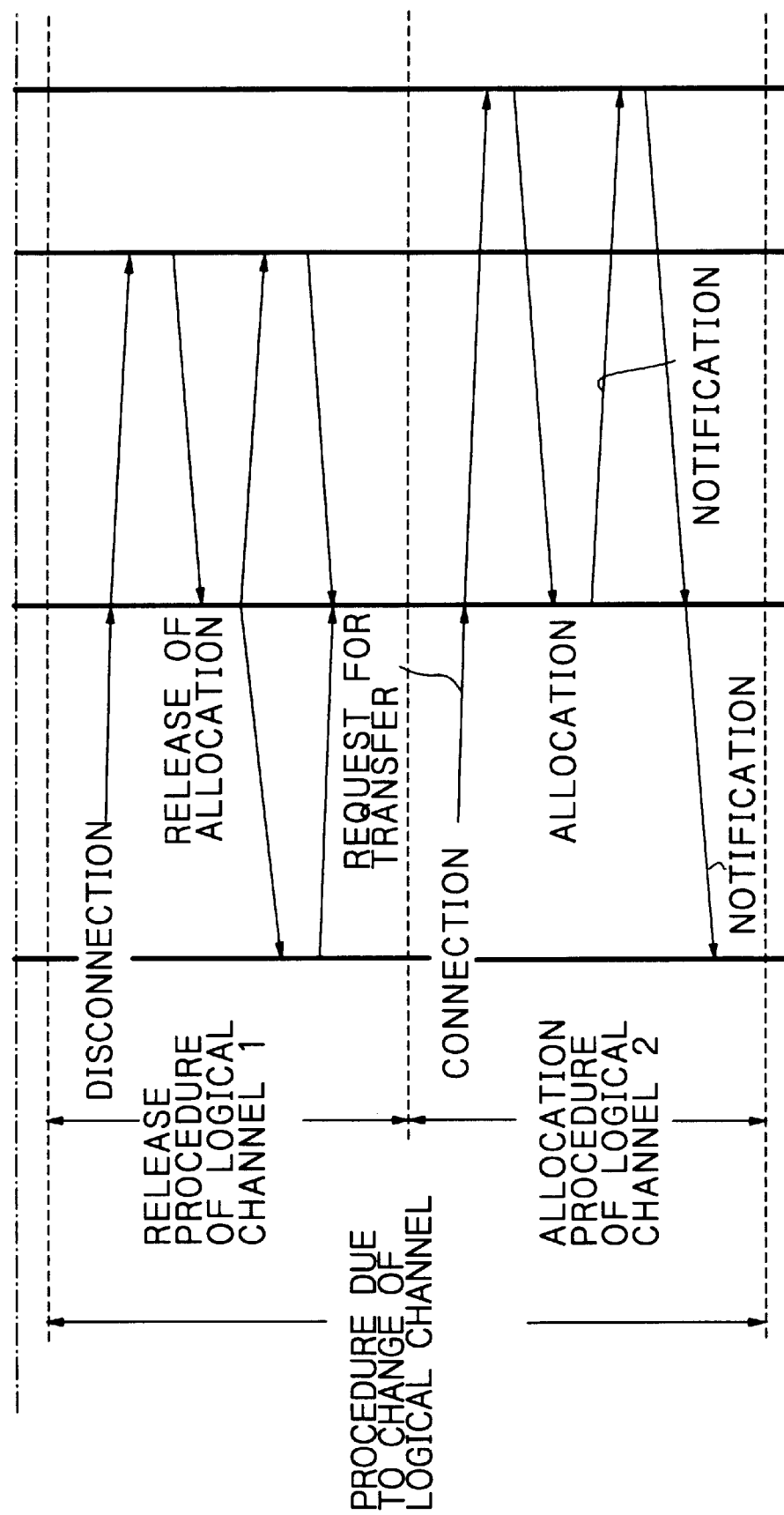
Figure 3C:
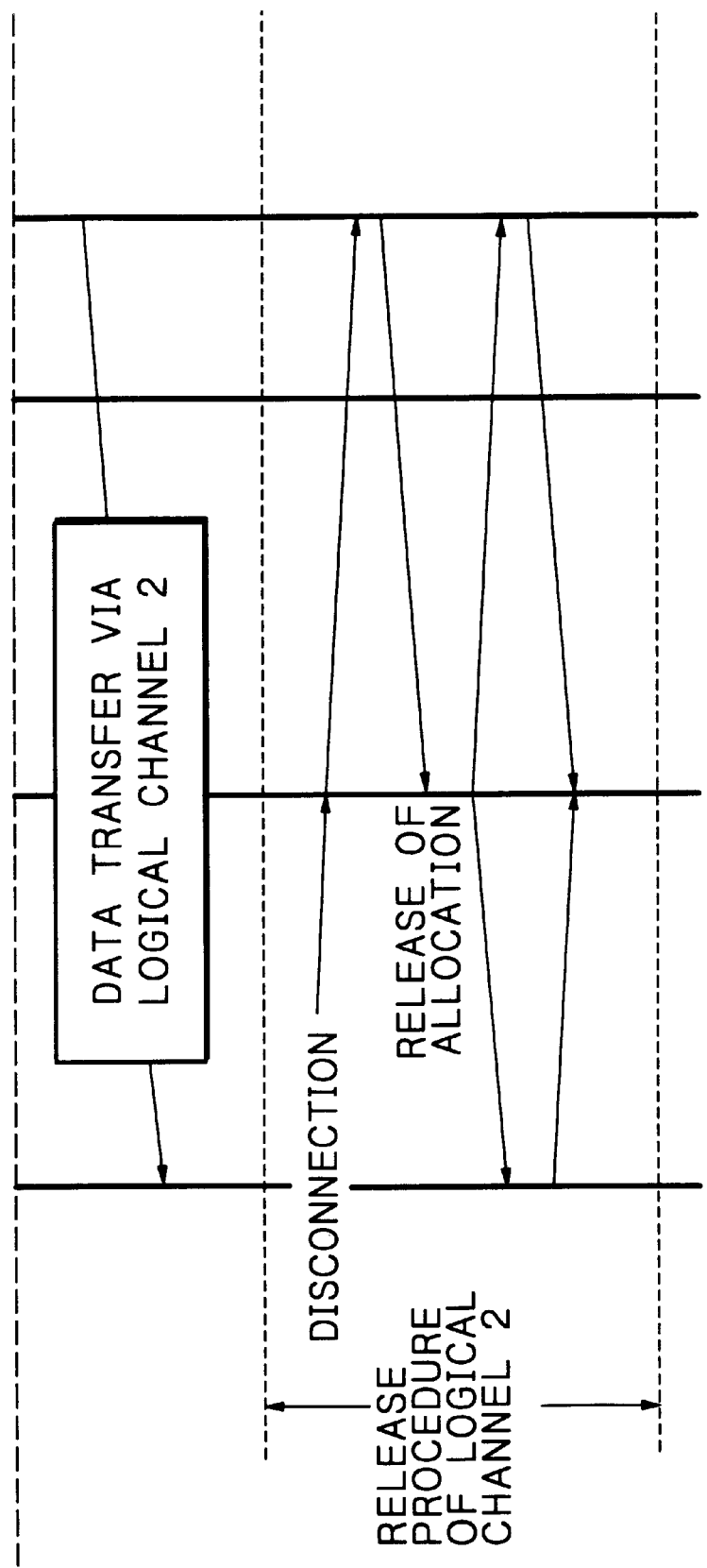
Figure 13:
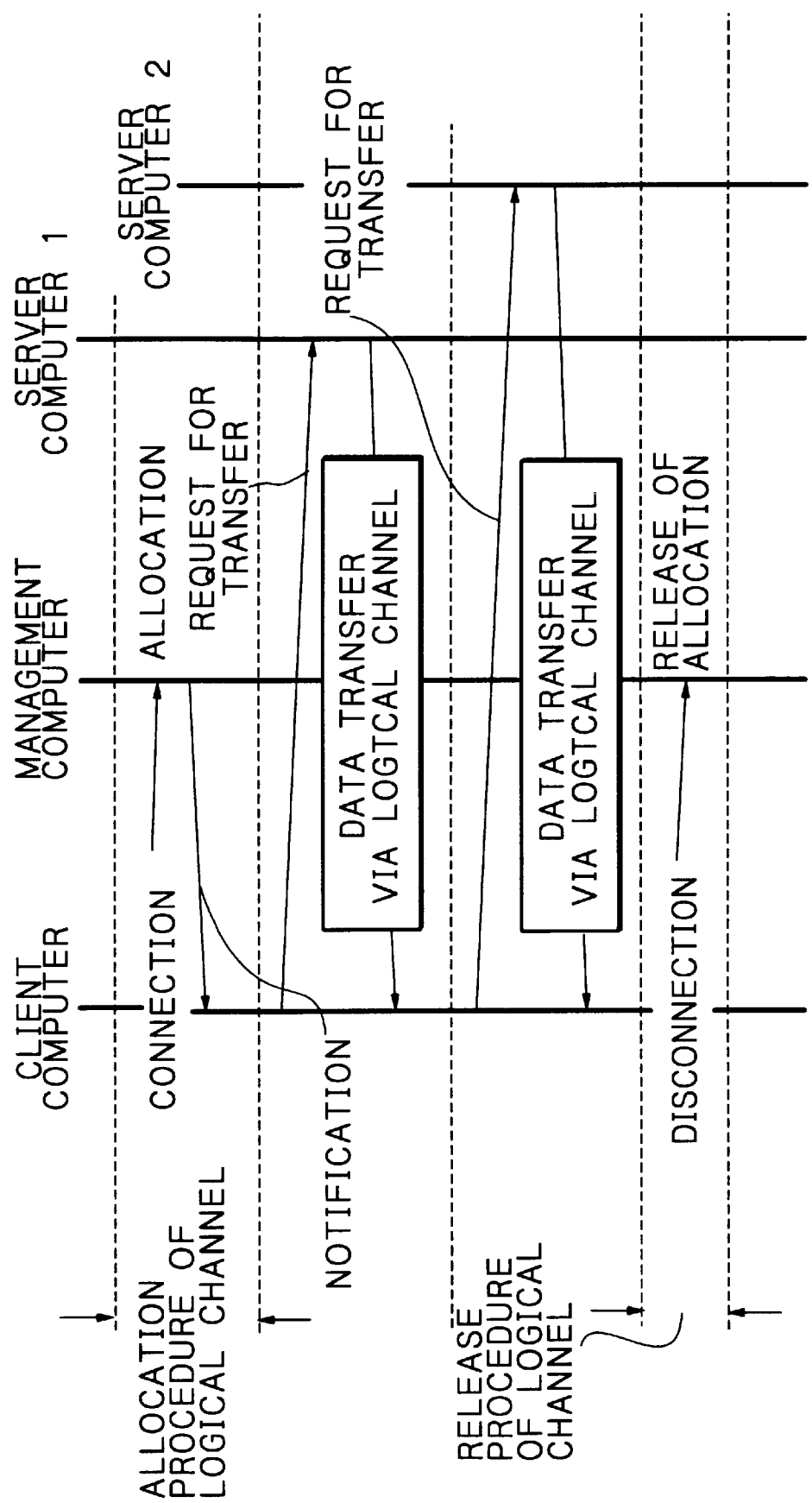
FIG. 13 illustrates the signal flow between a client and servers according to the present invention.

FIG. 13 illustrates the signal flow in the routing method according to the present invention, in which a client computer continuously receives data from two server computers. As will be more apparent by comparing FIG. 13 with FIG. 3, according to the present invention, no switching of the logical channel is executed for continuously transmitting data to the client computer from the different server computers. Thus, no delay in start of next and following transfer data, and also no increasing of control traffic due to the switching of the logical channel will occur.

Many widely different embodiments of the present invention may be constructed without departing from the spirit and scope of the present invention. It should be understood that the present invention is not limited to the specific embodiments described in the specification, except as defined in the appended claims.

What is claimed is:

1. A satellite communication system comprising:
   at least one client computer for requesting transfer of data;
   at least one server computer for transferring data in response to the request;
   a relay system using at least one satellite, for providing a plurality of logical channels for communication between said at least one client computer and said at least one server computer; and
   a management computer for managing said logical channels, to select one of said logical channels when said at least one client computer requests usage of logical channel, to execute routing procedure in said relay system so as to connect the selected logical channel with said at least one client computer, and to clear the routing of said logical channel from said at least one server computer to said at least one client computer when said at least one client computer notifies the end of logical channel usage to the management computer.

2. The system as claimed in claim 1, wherein said system further comprises a bidirectional communication means between said management computer and said at least one client computer, and wherein said request for usage of logical channel from said at least one client computer and said notification of the end of logical channel usage from said at least one client computer are transmitted via said bidirectional communication means.

3. The system as claimed in claim 2, wherein, when said routing procedure is executed, said management computer notifies information necessary for using the selected logical channel, to said at least one client computer via said bidirectional communication means.

4. The system as claimed in claim 1, wherein, after said routing procedure is executed by said management computer in response to the request for usage of logical channel and before said notification of the end of logical channel usage from said at least one client computer, data are transferred from said at least one server computer to said at least one client computer via said selected logical channel.

5. The system as claimed in claim 1, wherein said relay system is located between said at least one server computer and said at least one satellite, and wherein said relay system has a proxy server for mediating the data transfer between said at least one client computer and said at least one server computer so that data is transferred from said at least one server computer via said relay system and said at least one satellite.

6. The system as claimed in claim 1, wherein, after said routing procedure is executed by said management computer in response to the request for usage of logical channel and before said notification of the end of logical channel usage from said at least one client computer, said at least one client computer serially receives a plurality of data from said at least one server computer via said selected logical channel without requesting usage of logical channel again.

7. A routing method for a satellite communication system which includes a relay system using at least one satellite, for providing a plurality of logical channels for communication between at least one client computer for requesting transfer of data and at least one server computer for transferring data in response to the request, and a management computer for managing said logical channels, said method comprising the steps of:

requesting usage of logical channel from said at least one client computer to said management computer before requesting data transfer;

selecting one of said logical channels by said management computer in response to the request for logical channel usage;

executing, by said management computer, routing procedure in said relay system so as to connect the selected logical channel with said at least one client computer;

notifying, from said at least one client computer, the end of logical channel usage to said management computer when the data transfer from said at least one server computer is completed; and clearing, by said management computer, the routing of said logical channel from said at least one server computer to said at least one client computer in response to said notification of the end of logical channel usage.

8. The method as claimed in claim 7, wherein said request for usage of logical channel from said at least one client computer and said notification of the end of logical channel usage from said at least one client computer are transmitted via a bidirectional communication means between said management computer and said at least one client computer.

9. The method as claimed in claim 8, wherein, when said routing procedure is executed, said management computer notifies information necessary for using the selected logical channel, to said at least one client computer via said bidirectional communication means.

10. The method as claimed in claim 7, wherein, after said routing procedure is executed by said management computer in response to the request for usage of logical channel and before said notification of the end of logical channel usage from said at least one client computer, data are transferred from said at least one server computer to said at least one client computer via said selected logical channel.

11. The method as claimed in claim 7, wherein, after said routing procedure is executed by said management computer in response to the request for usage of logical channel and before said notification of the end of logical channel usage from said at least one client computer, said at least one client computer serially receives a plurality of data from said at least one server computer via said selected logical channel without requesting usage of logical channel again.

12. A storage device with a program for routing in a satellite communication system which includes a relay system using at least one satellite, for providing a plurality of logical channels for communication between at least one client computer for requesting transfer of data and at least one server computer for transferring data in response to the request, said program comprising the steps of selecting one of said logical channels when said at least one client computer requests usage of logical channel, executing routing procedure in said relay system so as to connect the selected logical channel with said at least one client computer, and clearing the routing of said logical channel from said at least one server computer to said at least one client computer when said at least one client computer notifies the end of logical channel usage.

13. The storage device as claimed in claim 12, wherein said request for usage of logical channel from said at least one client computer and said notification of the end of logical channel usage from said at least one client computer are transmitted via a bidirectional communication means between said management computer and said at least one client computer.

14. The storage device as claimed in claim 13, wherein, when said routing procedure is executed, said management computer notifies information necessary for using the selected logical channel, to said at least one client computer via said bidirectional communication means.

15. The storage device as claimed in claim 12, wherein, after said routing procedure is executed by said management computer in response to the request for usage of logical channel and before said notification of the end of logical channel usage from said at least one client computer, data are transferred from said at least one server computer to said at least one client computer via said selected logical channel.

16. The storage device as claimed in claim 12, wherein, after said routing procedure is executed by said management computer in response to the request for usage of logical channel and before said notification of the end of logical channel usage from said at least one client computer, said at least one client computer serially receives a plurality of data from said at least one server computer via said selected logical channel without requesting usage of logical channel again.

* * * * *